Aug. 8, 1967    M. B. LUCAS    3,334,612
MECHANISM FOR APPLYING HOT MELT ADHESIVES
Filed Oct. 6, 1966    3 Sheets-Sheet 1

INVENTOR.
Malcolm B. Lucas
BY Fredrik H. Brown
ATTORNEY

Aug. 8, 1967  M. B. LUCAS  3,334,612
MECHANISM FOR APPLYING HOT MELT ADHESIVES
Filed Oct. 6, 1966  3 Sheets-Sheet 2

INVENTOR.
Malcolm B. Lucas
BY
Fredrick H. Brown
ATTORNEY

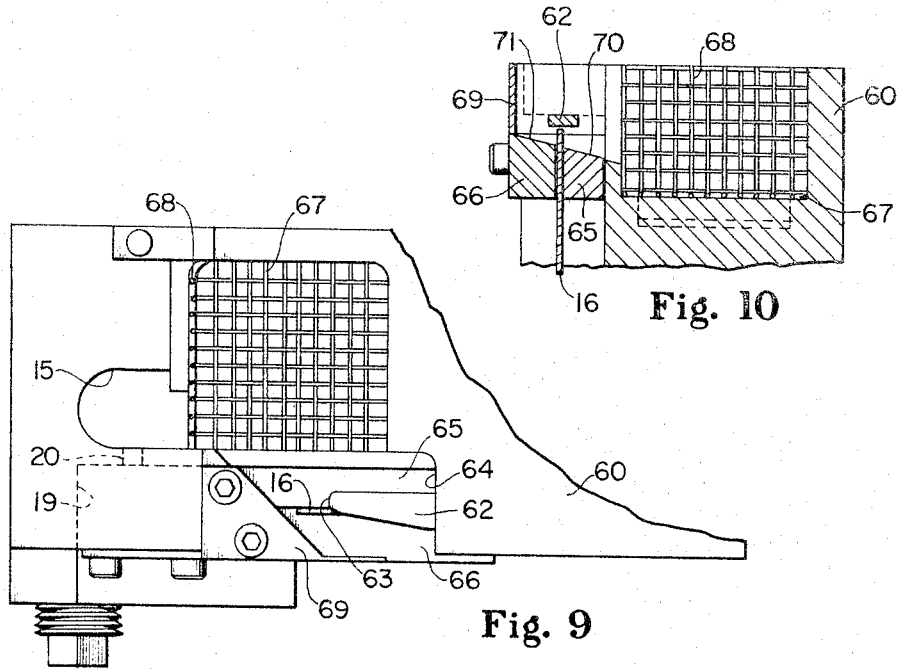
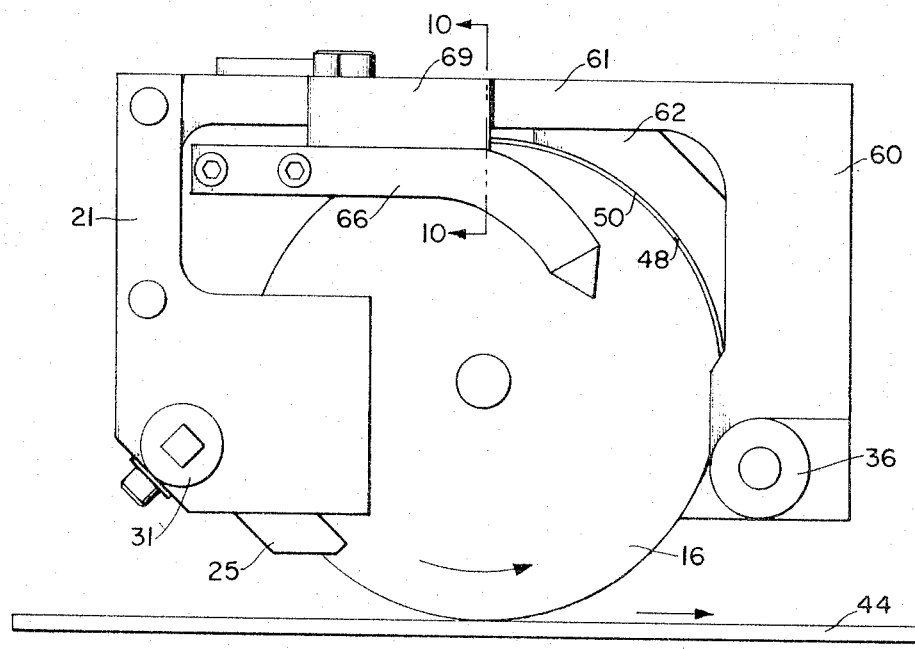

3,334,612
MECHANISM FOR APPLYING HOT MELT
ADHESIVES
Malcolm B. Lucas, Cincinnati, Ohio, assignor to The
Procter & Gamble Company, Cincinnati, Ohio, a corporation of Ohio
Filed Oct. 6, 1966, Ser. No. 598,546
9 Claims. (Cl. 118—261)

This application is a continuation-in-part of the copending application of Malcolm B. Lucas, Ser. No. 553,231, filed May 26, 1966, now abandoned, and entitled, Mechanism for Applying Hot Melt Adhesives.

This invention relates to an applicator for hot melt adhesives. In particular, the invention relates to an applicator having novel and useful features such that adhesive can be applied to objects passing beneath the applicator without any dripping of adhesive on the objects.

Because of their many advantages, hot melt adhesives are becoming more commonplace in the production and manufacture of various types of products made from well known materials such as paper, film, foil, leather, fabric, wood and the like. Typically, the adhesive is applied by means of an applicator having a rotating transfer wheel driven by the parent machine. The molten adhesive is fed into a reservoir of the applicator. The peripheral speed of the applicator wheel is synchronized with the surface speed of the material on which the adhesive is picked up and transferred to the work. The adhesive can be melted in the applicator itself or a separate melting device can be used where high adhesive demand makes this more feasible.

Most conventional wheel-type applicators apply the adhesive to the work passing above the wheel. Such an arrangement is highly advantageous since adhesive leakage from the applicator will not fall on the work. In some instances, it is important or more desirable to apply the adhesive to the work passing beneath the applicator. This has one serious drawback, however, since previously known applicators tend to leak particularly when used for extended time periods. This causes dripping of adhesive on the workpiece which can be particularly undesirable where the surface of the work is to be a product which is in contact with the skin of a user, as for example, disposable paper diapers.

It is a principal object of the present invention to overcome the shortcomings of previous hot melt adhesive applicators and, in particular, those of the type in which the work passes beneath the applicator.

Another object of the invention is the provision of a wheel-type adhesive applicator for hot melt adhesives which is so constructed and arranged that adhesive may be continuously or intermittently applied to products passing beneath the applicator without any leakage and/or dripping of adhesive even when the applicator is operated continuously for long periods of time.

A further object of the present invention is the provision of a wheel-type hot melt adhesive applicator in which the applicator wheel has the major area of one surface exposed to permit convenient inspection of adhesive passages and reservoirs and to permit cleaning of same if and when necessary.

The nature and substance of the invention can be briefly summarized as comprising an apparatus for applying molten thermoplastic adhesive including a mounting block and an applicator wheel journaled therein for applying relatively thin stripes of the molten adhesive to a workpiece passing beneath the wheel in contact therewith. An adhesive reservoir is formed at one side of the block by the use of wiper elements and a doctor blade such that the molten hot melt adhesive is fed into the reservoir and out through a slot in the doctor blade. The doctor blade is adjustable to control the thickness of the adhesive on the periphery of the wheel as it emerges from the reservoir. The applicator wheel passes over a string breaker device after the adhesive is applied to the work. Thereafter it passes through a relatively long and narrow arcuate passageway formed beyond the string breaker and extending throughout most of its path of travel in returning to the reservoir. The narrow arcuate passageway forms a return path for the flow of excess adhesive to prevent gathering of the adhesive in any one area which would result in dripping on the work. A guide channel is preferably provided intermediate the narrow arcuate passageway and the string breaker to inhibit flow of any excess adhesive to the side surface of the applicator which might also result in rundown and dripping.

While the specification concludes with claims particularly pointing out and distinctly claiming the subject matter regarded as forming the present invention, it is believed the invention will be better understood from the following description taken in connection with the accompanying drawings in which:

FIGURE 8 is a side elevation of a modified applicator having means for filtering and recirculating the adhesive.

FIGURE 9 is a fragmentary plan view of the modified applicator of FIGURE 8.

FIGURE 10 is a fragmentary elevation in cross section taken on the line 10—10 of FIGURE 8.

Figure 1:
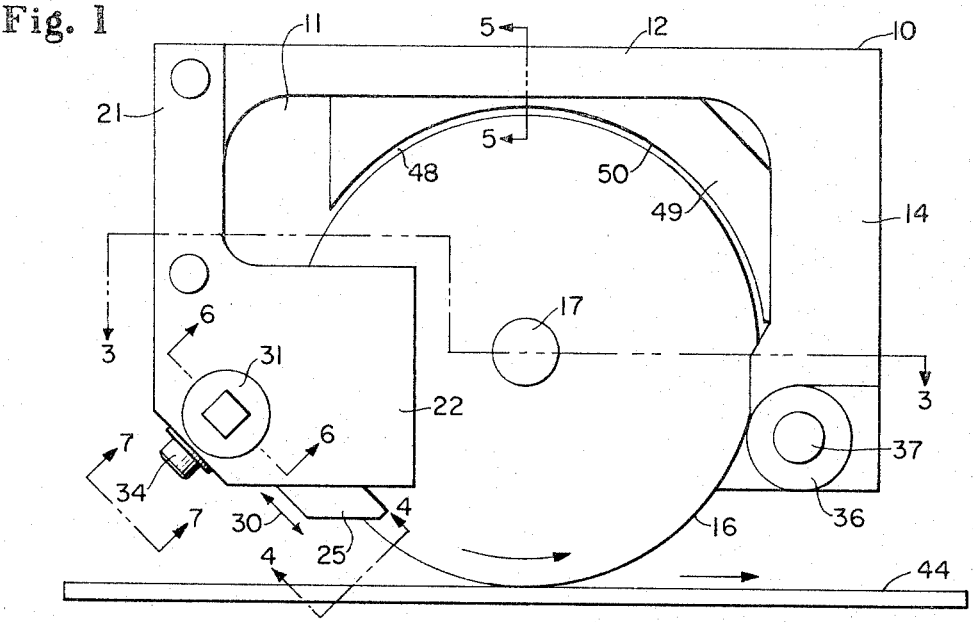
FIGURE 1 is a side elevation of the applicator of the invention shown applying adhesive to a piece of work.
Figure 2:
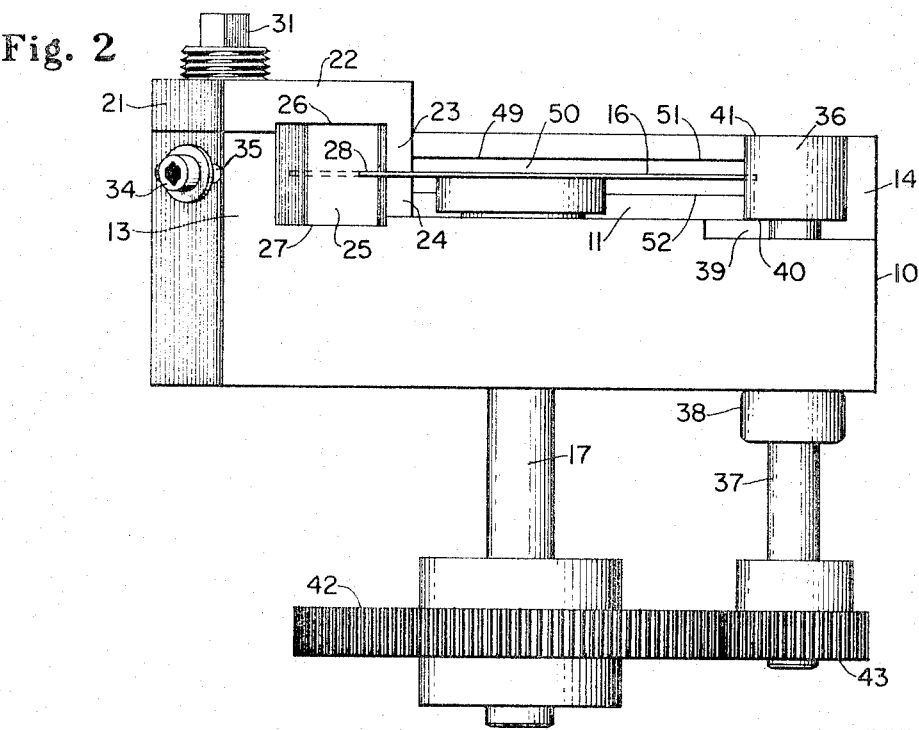
FIGURE 2 is a bottom plan view of the applicator showing the exposed portion of the doctor blade and string breaker roll.
Figure 3:
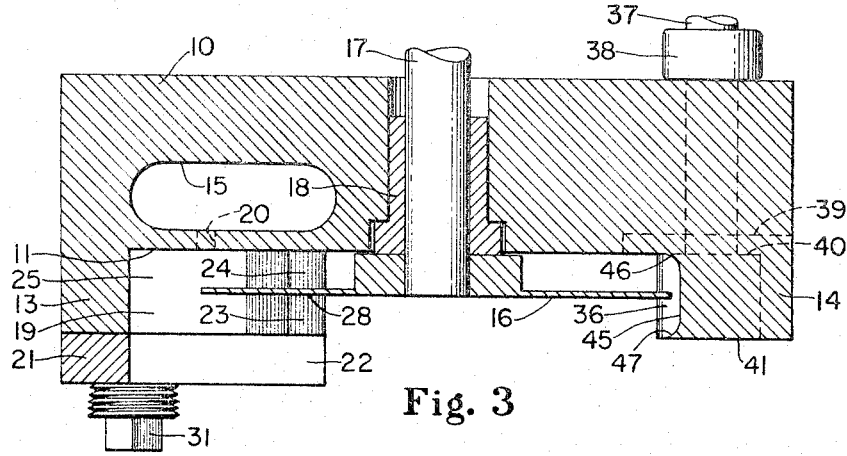
FIGURE 3 is a cross section of the applicator taken on the line 3—3 of FIGURE 1.

Referring now to the drawings and in particular to FIGURES 1, 2 and 3, the applicator of the invention comprises a mounting block 10 which may be rectangular in configuration and of substantial thickness. In ordinary use the mounting block 10 is rigidly secured to a machine and operated in synchronous relationship therewith. The block 10 may have one of its sides hollowed at 11 (FIGURES 3 and 5) thus leaving an outwardly projecting top ledge 12 (FIGURES 1 and 5) and the downwardly projecting side ledges 13 and 14 (FIGURE 3). The block 10 is preferably also hollowed as at 15 (FIGURE 3) for the reception of the hot melt adhesive which is preferably melted and fed into the hollow 15 in molten state by means of an electrically heated pre-melt body (not shown).

An applicator wheel 16 is mounted on a shaft 17 which in turn is journaled in the bearing 18 secured in the block 10 as shown in FIGURE 3. It will be noted in FIGURES 2 and 3 that the applicator wheel 16 is of relatively thin cross section in relation to its outside diameter in order that a thin stripe of adhesive may be applied. The adhesive reservoir shown generally at 19 (FIGURE 3) is supplied with molten adhesive from the hollow 15 by means of the transverse passageway 20 (FIGURE 3). In the arrangement shown, the major area of the applicator wheel 16 is exposed as seen in FIGURE 1.

The adhesive reservoir 19 mentioned briefly above is composed of the several elements to be hereinafter described. A cover plate 21 is secured to the side ledge 13 and has an inwardly extending foot portion 22 as seen in FIGURES 1, 2 and 3. The cover plate 21 is provided with a wiper element 23 extending inwardly from the foot portion 22 such that it is in contiguous relationship with the side surface of the wheel 16. A similar wiper element 24 extends from the block 10 of the applicator. The applicator wheel 16 passes between the wiper elements 23 and 24 so that the wheel 16 leaves the reservoir 19 with only a minimum thickness of adhesive on its side surfaces.

Figure 4:
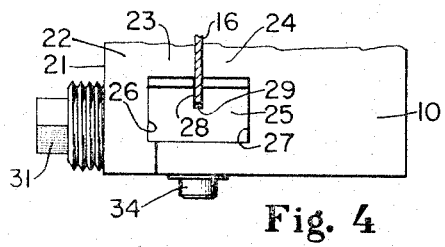
FIGURE 4 is a fragmentary view partially in cross section taken on the line 4—4 of FIGURE 1 showing the adjustable doctor blade and the applicator wheel passing through its slot.

An adjustable doctor blade 25 is provided at the bottom of the reservoir 19 to control the thickness of adhesive on the periphery of the wheel 16 as it leaves the reservoir 19. The doctor blade 25, as seen in FIGURE 4, is slideable in the channels 26 and 27 (FIGURES 2 and 4) which are cut, respectively, in the cover plate 21 and block 10. The doctor blade 25 forms the bottom of the reservoir 19. A slot 28 is formed in the doctor blade 25. The outer edge of the wheel 16 passes through the slot 28 on emerging from the reservoir. The clearance 29 between the slot 28 and the periphery of the applicator wheel 16 determines the thickness of adhesive that is applied to the wheel. The doctor blade 25 can be moved in either of the directions shown by double-ended arrow 30 (FIGURE 1) to change the width of the clearance 29. The applicator may be operated with the width of the clearance 29 in the range of from about 0 inch (when using an intaglio wheel) to about .060 inch (using a wheel with a smooth outer periphery). It is preferable, however, to adjust the clearance 29 to a width of from about .025 inch to about .035 inch when using a wheel having a smooth outer periphery.

Figure 7:
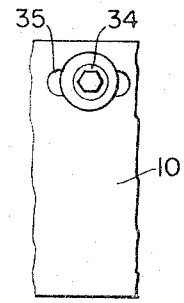
FIGURE 7 is a fragmentary view taken on the line 7—7 of FIGURE 1 showing the locking screw for the adjustable doctor blade.

An adjusting screw 31 is threaded in the cover plate 21 as shown in FIGURES 1, 2, 4 and 6. The inner end of the adjusting screw 31 has a pin 32 (FIGURE 6) secured therein, said pin engaging a slot 33 in the side surface of the doctor blade 25. Thus, it will be apparent that rotation of the adjusting screw 31 will cause the doctor blade 25 to move in either of the directions indicated by double arrow 30 depending, of course, on the direction in which the adjusting screw 31 is turned. The position of the doctor blade 25 can be permanently fixed by turning down the set screw 34 shown in FIGURES 1 and 7 which is threaded into the doctor blade 25 and is slidable in the slot 35 provided in the block 10.

An adhesive string breaker is provided which may comprise the string breaker roll 36 mounted on shaft 37 journaled in the block 10. A collar 38 is secured to the shaft 37 to prevent axial movement of the string breaker roll 36. The block 10 is cut away to provide a clearance at 39 (FIGURE 2) in order that the side faces 40 and 41 of the string breaker roll 36 are substantially separated from any other surface of the applicator. Such separation is desirable to prevent dripping since transfer of adhesive is prevented from the string breaker roll 36 to a stationary surface of the block 10.

The applicator wheel 16 and string breaker roll 36 are driven in timed relation such that their surface speeds are substantially matched. This can be accomplished by means of the gear 42 and pinion 43 secured to the shafts 17 and 37, respectively. It will be understood that the gear 42 may be driven from a suitable drive gear (not shown) turning at the proper speed to provide synchronous action with the machine. As a consequence, the workpiece 44 (FIGURE 1) to which adhesive is being applied is in contact with the applicator wheel 16 and is moved along at the same speed as the peripheral speed of the applicator wheel 16.

The side ledge 14 of the block 10 is provided with a guide channel 45 above the string breaker roll 36 as shown in cross section in FIGURE 3. The ends of the guide channel 45 terminate in the curved end projections 46 and 47 which are turned inwardly toward the axis of the applicator wheel 16. The latter elements, i.e., the curved end projections 46 and 47, are very desirable since they cooperate to funnel any adhesive deposited on the guide channel 45 back upon the periphery of string breaker roll 36 from where the adhesive can be picked up by the applicator wheel 16 for return to the adhesive reservoir 19.

Figure 5:
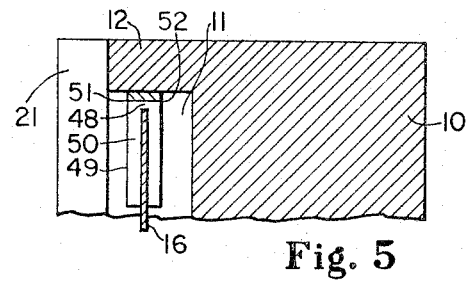
FIGURE 5 is a fragmentary view in cross section taken on the line 5—5 of FIGURE 1 showing the clearance over the periphery of the applicator wheel whereby a narrow arcuate passageway is provided.
Figure 6:
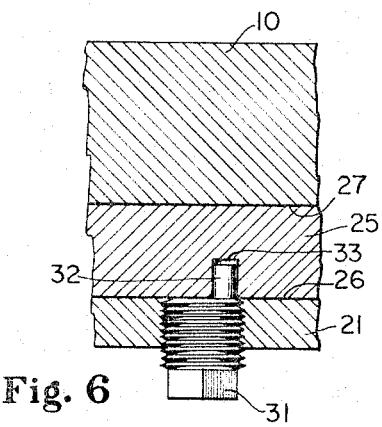
FIGURE 6 is a fragmentary view taken on the line 7—7 of FIGURE 1 showing the details of the adjusting screw for the doctor blade.

Means are provided to form a controlled path for the return of excess adhesive on the periphery of the applicator wheel 16. These latter means comprise a narrow arcuate passageway 48 between the periphery of the applicator wheel 16 and the insert 49 secured to the block 10. The insert 49 is shown as a separate element herein, yet it will be understood that it can be formed integrally from the same material as the block 10 if desired. As shown in FIGURES 1 and 5, the narrow arcuate passageway 48 is formed between the periphery of the applicator wheel 16 and the curved surface 50 of the insert 48. Referring now to FIGURE 5, it will be seen that the curved surface 50 is substantially wider than the width of the wheel 16 and terminates at sharp corners 51 and 52, these latter being important since they prevent outflow of adhesive beyond the edges of the insert 49 to limit the area wetter by any adhesive deposited on the insert 49 to the surface 50 of the insert 49. It is important to note that the narrow arcuate passageway extends from the guide channel 45 across the upper path of travel of the wheel 16 until the latter passes downwardly into the reservoir 19. The width of the narrow arcuate passageway 48 is preferably fixed between a minimum of .025 inch and a maximum of .032 inch in order to obtain the most desirable results. By maintaining a close clearance in this range, it has been found that the periphery of the wheel 16 coacts with the surface 50 of the insert 49 to create a viscous pump and thus control the return flow of any excess adhesive deposited on the surface 50. In other words, such excess adhesive is caused to flow in the direction of wheel movement whereby it is ultimately returned to the adhesive reservoir 19.

With the above apparatus, the work 44 can be passed continuously beneath the wheel 16 and the desired thickness of adhesive transferred thereto without any dripping of adhesive from the applicator. The parts of the applicator are so designed as heretofore explained that adhesive accumulation on the applicator body will not occur and any excess is caused to return to the reservoir 19. It is also possible to apply adhesive effectively and without dripping when the work is fed intermittently at spaced intervals to the applicator wheel 16. During the intervals that the applicator wheel 16 is out of contact with a workpiece, any adhesive on the periphery of the wheel 16 which is not transferred will be returned to the reservoir 19.

Adhesive stringers that may be formed because of the tacky nature of the adhesive material will be broken as the applicator wheel passes the string breaker roll 36. Thereafter the guide channel 45 in cooperation with the narrow arcuate passageway 48 prevents build-up of adhesive in any area of the applicator such that any excess adhesive is progressively returned from the string breaker roll 36 to the guide channel 45, the narrow arcuate passageway 48 to the reservoir 19. With the open face of the applicator wheel it is also possible to conveniently inspect all of the adhesive passages and reservoirs and to permit clean-out of same as may be necessary and yet obtain highly consistent results wherein dripping of adhesive onto the work is entirely eliminated.

A modified form of the applicator is illustrated in FIGURES 8, 9, and 10. The basic applicator structure is essentially similar to that previously described. The modified applicator, however, includes an adhesive diversion and filtering system as part of its design.

Filtration of the recirculated portion of the hot melt adhesive is particularly desirable whenever the adhesive is being applied to soft paper type products such as paper wadding, wherein particles of the wadding material or other foreign objects may be picked up by the applicator wheel and returned to the adhesive reservoir. Under these latter circumstances, the wadding particles or foreign material tend to inhibit flow of adhesive from the reservoir, thus substantially hampering the operation of the applicator.

To eliminate the above problem, the applicator previously described may be modified by the provision of a diverter and filtering system. In the ensuing description of this system, elements of the applicator which are common to the previously described design will have the same reference numerals whereas new or modified elements have been assigned new reference numerals.

In the modified device of FIGURES 8, 9, and 10, the mounting block 60 having an outwardly projecting top ledge 61 is provided, there being an applicator wheel 16 mounted for rotation in the block 60. The applicator includes a cover plate 21 and a doctor blade 25 which form elements of the adhesive reservoir 19 as in the previously described structure. Additional adhesive is fed to the applicator in the hollow 15 from where it flows to the reservoir 19 through the transverse passageway 20. An insert 62 is mounted in the block 60 to provide the narrow arcuate passageway 48. The insert 62 is somewhat shorter than in the previous embodiment and terminates at the rounded end 63.

The top ledge 61 is cut away as at 64 to provide room for suitable scraper and deflecting elements. A curved inner wiper 65 and a curved outer wiper 66 are mounted in contiguous relationship to the side and peripheral surfaces of the wheel 16. The wiper elements 65 and 66 are provided to remove essentially all of the adhesive from the wheel 16 and divert the adhesive to a filtering system including the horizontal screen 67 and the vertical screen 68. A deflector 69 is provided to guide the adhesive flow to the screen 67. To further facilitate flow to the filtering system, the wiper elements 65 and 66 are beveled as at 70 and 71, respectively (see FIGURE 10).

Thus, the wiper elements 65 and 66 remove substantially all of the returning adhesive from the wheel 16. The adhesive then flows by gravity to the horizontal screen 67. Gravity flow also induces the adhesive to flow through the screens 67 and 68 and return to the hollow 15. The adhesive returns to the reservoir 19 by way of the transverse passageway 20.

Particles which are picked up from the workpiece 44 and other foreign matter that may be detrimental to efficient operation are retained by the screens 67 and 68. These particles can be removed periodically so that the applicator can be operated continuously without delays.

Various thermoplastic or hot melt adhesives may be used in the applicator, but the preferred adhesives for use in this invention are those which, at room temperatures, are solid but flexible, gradually softening to a fluid stage or a condition soft enough for application at a temperature of about 200° F. to 400° F. Such adhesives are made from or are constituted of a mixture of two or more materials chosen from a class consisting of vegetable starches, polyethylenes, terpene resins, vegetable or mineral waxes, and related compounds. An exemplary suitable material is sold by United Shoe Machinery Company under the trade name "Thermo Grip #407 Adhesive."

While particular embodiments of the invention have been illustrated and described, it will be obvious to those skilled in the art that various changes and modifications can be made without departing from the spirit and scope of the invention and it is intended to cover in the appended claims all such changes and modifications that are within the scope of this invention.

What is claimed as new is:

1. An apparatus for applying molten thermoplastic adhesive comprising the combination of a mounting block, an applicator wheel journaled in the block for transferring a molten thermoplastic adhesive by contact with a piece of work moving beneath said wheel, an adhesive reservoir formed in said block at one side of said wheel, said reservoir including a pair of opposed wiper elements mounted in contiguous relationship to opposite sides of said wheel and a slotted doctor blade adjustably mounted below said wiper elements and forming the bottom of said reservoir, said applicator wheel being journaled in said mounting block such that the outer edge of said applicator wheel moves through said slot in said doctor blade, means for moving said doctor blade to adjust the thickness of adhesive on said applicator wheel periphery when it emerges from said reservoir, a narrow arcuate passageway formed above the periphery of said wheel to form a controlled path for return of excess adhesive to said reservoir, and adhesive string breaker means mounted in contiguous relationship to the periphery of the applicator wheel beyond the contact area between the wheel and the piece of work.

2. An apparatus as claimed in claim 1 wherein the narrow arcuate passageway is formed between the periphery of the applicator wheel and a stationary curved surface, said curved surface being substantially wider than the width of said applicator wheel, said surface terminating in sharp corners at both sides.

3. An apparatus as claimed in claim 2 wherein said adhesive string breaker means include a roll, the side surfaces of said roll being spaced from said block to prevent adhesive transfer and build-up on said mounting block.

4. An apparatus for applying molten thermoplastic adhesive as claimed in claim 2 wherein the width of the narrow arcuate passageway is in a range of from about .025 inch to about .032 inch.

5. An apparatus for applying molten thermoplastic adhesive as claimed in claim 1 including a guide channel in close proximity to the periphery of said applicator wheel between said narrow arcuate passageway and said string breaker means, said guide channel being substantially wider than said applicator wheel and terminating in curved projections at its ends, said projections being turned inwardly toward the axis of rotation of said applicator wheel.

6. An apparatus as claimed in claim 5 wherein the narrow arcuate passageway is formed between the periphery of the applicator wheel and a stationary curved surface, said curved surface being substantially wider than the width of said applicator wheel, said surface terminating in sharp corners at both sides.

7. An apparatus as claimed in claim 5 wherein said adhesive string breaker means includes a roll, the side surfaces of said roll being spaced from said block to prevent adhesive transfer and build-up on said mounting block.

8. An apparatus for applying molten thermoplastic adhesive as claimed in claim 6 wherein the width of the narrow arcuate passageway is in a range of from about .025 inch to about .032 inch.

9. An apparatus for applying molten thermoplastic adhesive as claimed in claim 8 including means for adjusting said doctor blade, said adjusting means comprising an adjusting screw, a pin projecting from said adjusting screw and engaging a slot in the side of said doctor blade and a set screw for holding the position of said doctor blade after it is in proper adjustment.

References Cited

UNITED STATES PATENTS

| | | | |
|---|---|---|---|
| 1,800,510 | 4/1931 | Cosgrove | 118 |
| 2,162,781 | 6/1939 | MacKenzie | 118—261 X |
| 2,622,557 | 12/1952 | Marcantel | 118—261 X |
| 2,726,629 | 12/1955 | Paulsen | 118—202 |
| 2,787,241 | 4/1957 | Kelly | 118—202 X |
| 2,868,160 | 1/1959 | Paulsen | 118—202 |
| 3,255,727 | 3/1963 | Boothroyd | 118—202 |
| 3,272,177 | 9/1966 | Kelly | 118—261 X |

CHARLES A. WILLMUTH Primary Examiner.

R. I. SMITH, Assistant Examiner.